United States Patent [19]
Melter et al.

[11] Patent Number: 5,469,625
[45] Date of Patent: Nov. 28, 1995

[54] COMPOUND ACTION HAND PRUNER

[75] Inventors: Craig H. Melter, Baraboo; Robert T. Schofield, Madison, both of Wis.

[73] Assignee: Fiskars Inc., Madison, Wis.

[21] Appl. No.: 289,110

[22] Filed: Aug. 11, 1994

[51] Int. Cl.$^6$ ..................................... B26B 13/26
[52] U.S. Cl. ................................... 30/251; 30/190
[58] Field of Search .................. 30/190, 251, 188, 30/250, 122

[56] References Cited

U.S. PATENT DOCUMENTS

| | | |
|---|---|---|
| 82,290 | 9/1968 | Campbell . |
| 126,888 | 5/1972 | Keethler . |
| 173,010 | 2/1976 | Humphries . |
| 192,426 | 6/1977 | Foltz et al. . |
| 787,414 | 4/1905 | Walton . |
| 1,436,603 | 11/1922 | Philbert . |
| 2,528,816 | 11/1950 | Boyer . |
| 2,744,323 | 5/1956 | Kuhlman . |
| 2,766,526 | 10/1956 | Pape . |
| 3,587,173 | 6/1971 | Hexdall . |
| 5,159,257 | 11/1992 | Weid et al. ............... 30/251 |
| 5,245,755 | 9/1993 | Krivec . |
| 5,307,565 | 5/1994 | Erbrick et al. . |

*Primary Examiner*—Douglas D. Watts
*Attorney, Agent, or Firm*—Foley & Lardner

[57] ABSTRACT

A hand pruner including a first handle and a second handle pivotally connected to said first handle, a first cutting blade secured to said second handle, a second cutting blade pivotally connected to said second handle for movement into engagement with said first cutting blade and a link connecting said second blade to said first handle whereby said second blade is pivoted into engagement with said first blade when said first handle is pivoted into engagement with said second handle, the cutting blades being laterally offset to provide a scissors cut and are convertible to an anvil cutting blade by mounting an anvil plate on the second cutting blade.

5 Claims, 9 Drawing Sheets

COMPOUND ACTION HAND PRUNER

FIELD OF THE INVENTION

The present invention relates to pruning tools and more particularly to a hand held pruner which provides a cutting force that is a multiple of the force exerted by the user on the handles to the cutting blade.

BACKGROUND OF THE INVENTION

Various types of hand tools have been designed which operate on the basis of a lever action, the lever being arranged so that the force applied to the cutting blades increases as the shears are closed. Typical of this type of cutting device are U.S. Pat. No. 1,436,603, issued on Nov. 21, 1922, for Pruning Device; U.S. Pat. No. 2,744,323, issued on May 8, 1956, for Shears; U.S. Pat. No. 2,766,526, issued on Oct. 16, 1956, for Metal Shears; U.S. Pat. No. 2,528,816, issued on Nov. 7, 1950, for Hedge Shears; and U.S. Pat. No. 787,414, issued on Apr. 18, 1905, for Pliers. Each of these devices use a connecting link to achieve a mechanical advantage by increasing the force applied as the shears are closed. The patent to Walton 787,414 discloses a pliers which provides a cutting force that increases rapidly from zero and decreases rapidly to zero as the arm pivots to a right angle.

The patents to Krivec 5,245,755, issued on Sep. 21, 1993, for Force-Multiplying Mechanism, and Hexdall 3,587,173, issued on Jun. 28, 1971, for Metal-Cutting Shears, both provide a lever action which provides an increasing force as the shears close for cutting metal.

SUMMARY OF THE PRESENT INVENTION

It is a general object of the present invention to provide an improved hand pruner which provides a maximum force on the blades when the handles are closed halfway with a constant force being applied to the handles.

An important feature of the invention is the provision for a hand pruner which can be easily reconfigured from a scissors type pruner to an anvil type pruner depending upon the material being cut.

Another feature of the invention is the provision of an ergonomic configuration of the operating handle which is bent at the operating end to permit better viewing of the cutting blades as well as reducing carpal tunnel fatigue in the arm of the operator.

An important advantage of the hand pruner is that the compound linkage mechanism generates a much greater cutting force at the intermediate point of travel of the blades which is significantly greater than provided by hand pruners.

These and other features of the invention are obtained by providing a force multiplying linkage which includes a pair of handles pivotally connected at one end thereof. A cutter blade and a hook are removably mounted on one of the handles. A pair of links are pivotally connected to one of the handles and to the hook for pivotal movement of the hook into engagement with the blade. The link is arranged to provide a maximum cutting force between the blade and the hook intermediate the distance of travel of the hook into engagement with the blade.

Other principal features and advantages of the invention will become apparent to those skilled in the art upon review of the following drawings, the detailed description and the appended claims.

BRIEF DESCRIPTION OF THE DRAWINGS

FIG. 21 is an exploded perspective view showing the anvil, hook and cutting blade.

Figure 2:
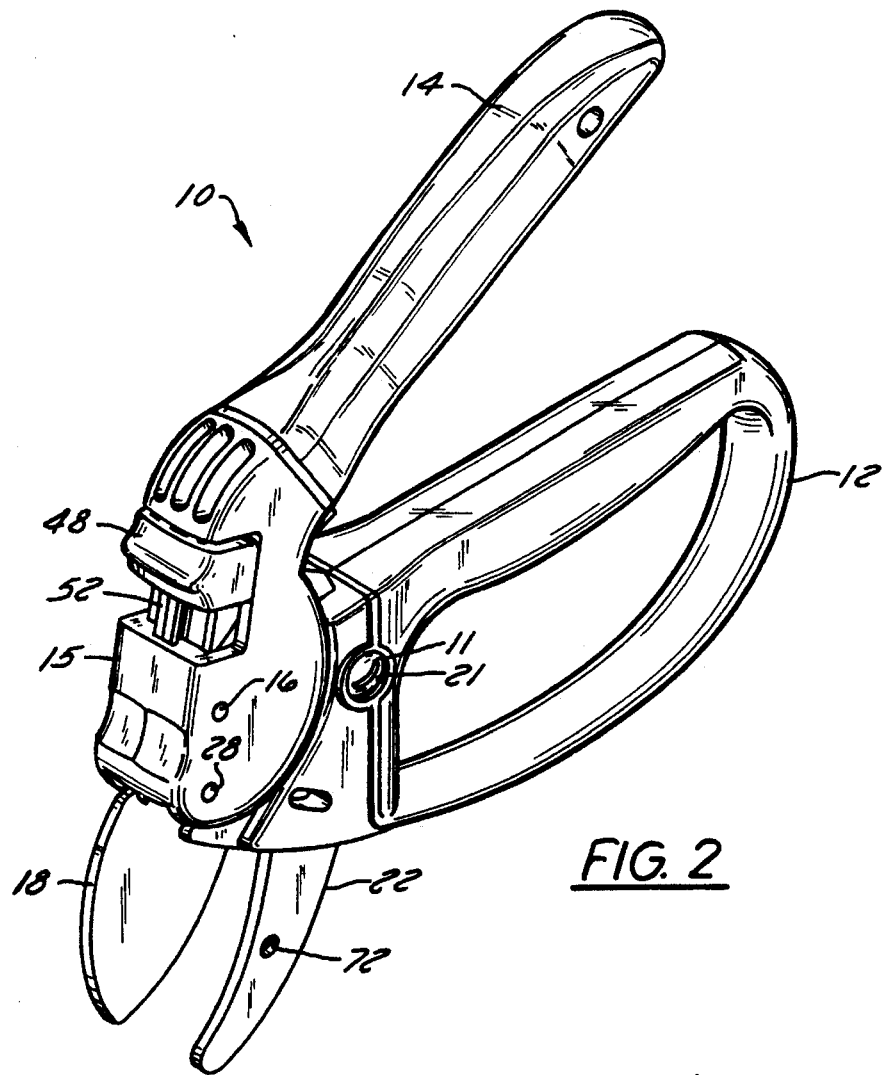
FIG. 2 is a view similar to FIG. 1 showing the pruner in the open position.
Figure 1:
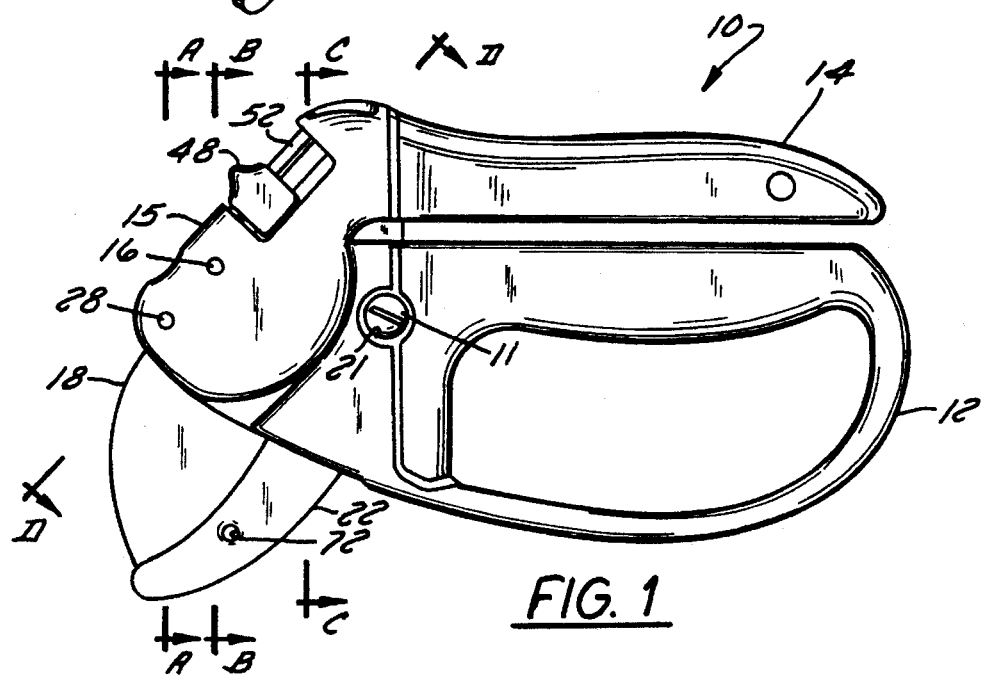
FIG. 1 is a view of the left side of the pruner in accordance with the present invention shown in a closed position.
Figure 3:
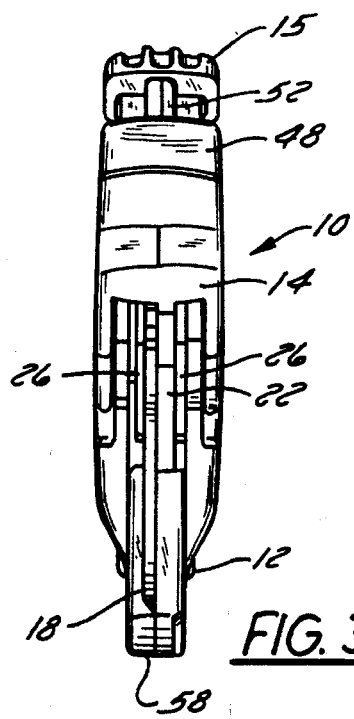
FIG. 3 is a front elevation view of FIG. 1.
Figure 4:
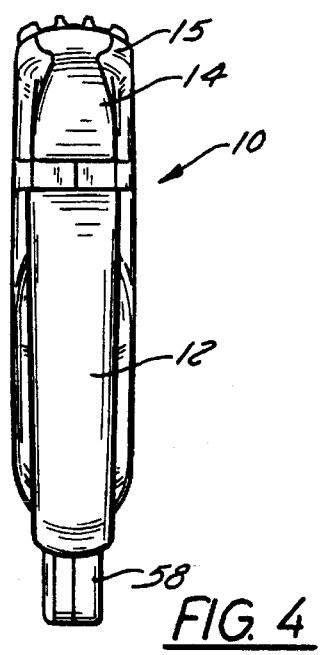
FIG. 4 is a back elevation view of FIG. 1.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 9:
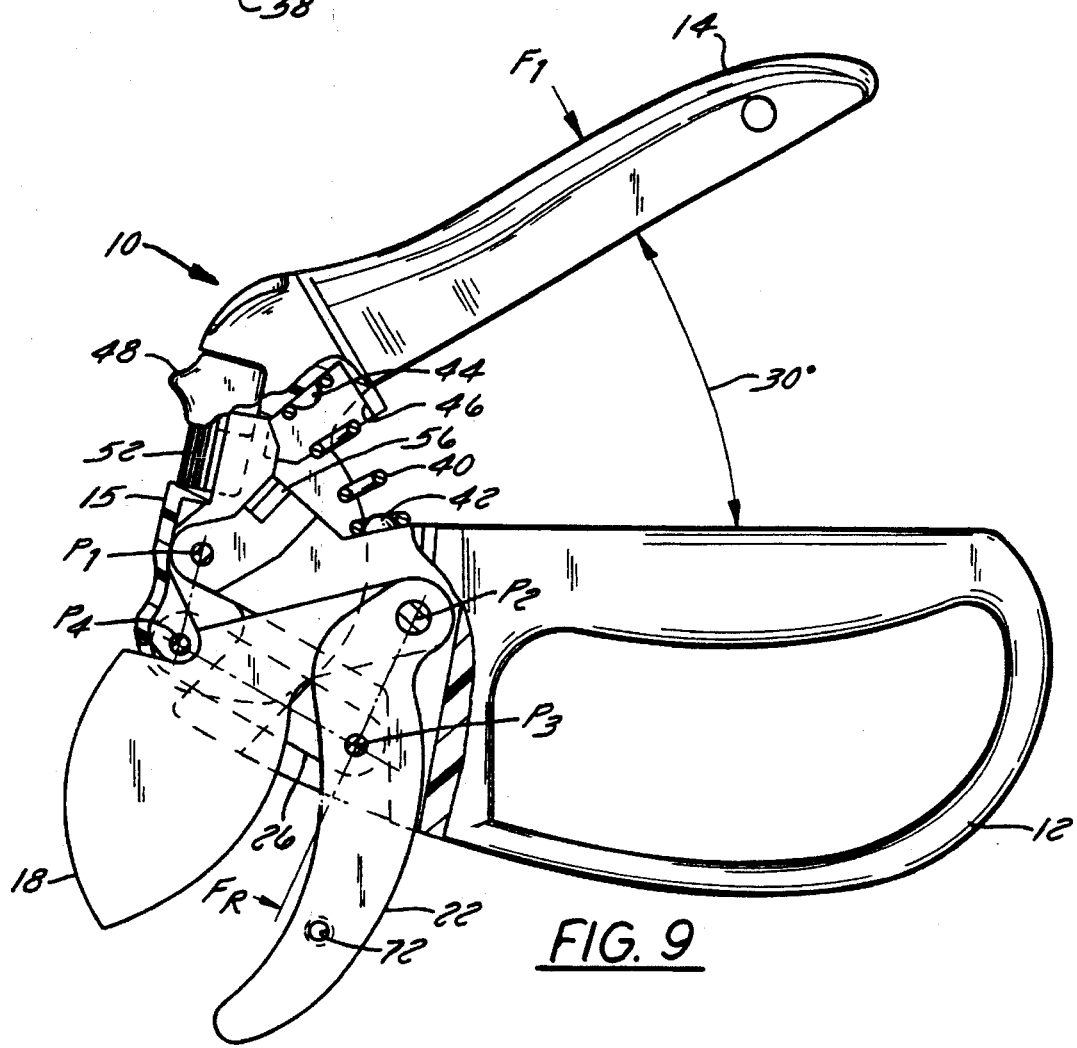
FIG. 9 is a left side elevation view partly broken away to show the open position of the linkage assembly.
Figure 5:
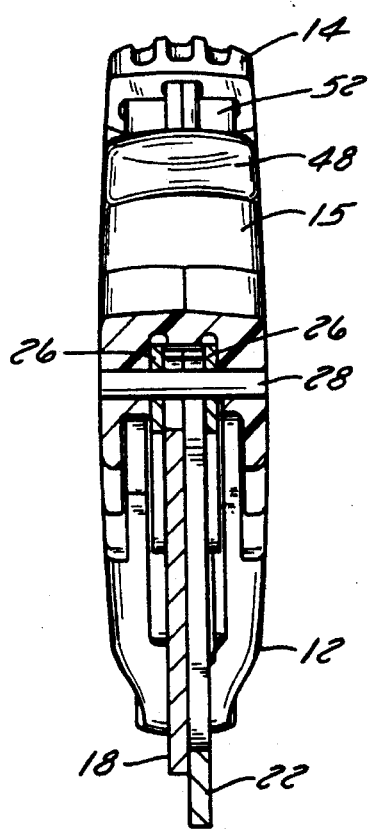
FIG. 5 is a view taken on line A—A of FIG. 1.
Figure 6:
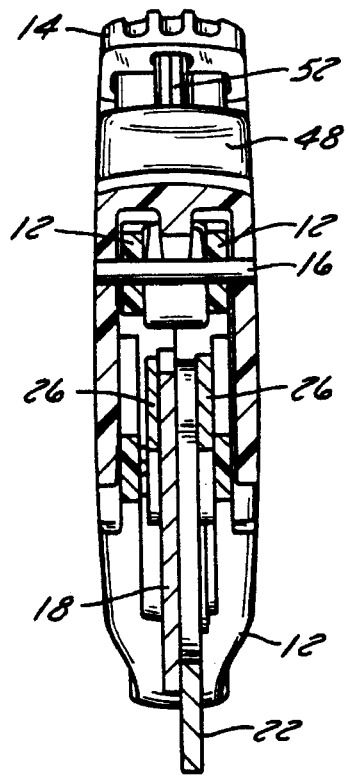
FIG. 6 is a view taken on line B—B of FIG. 1.
Figure 7:
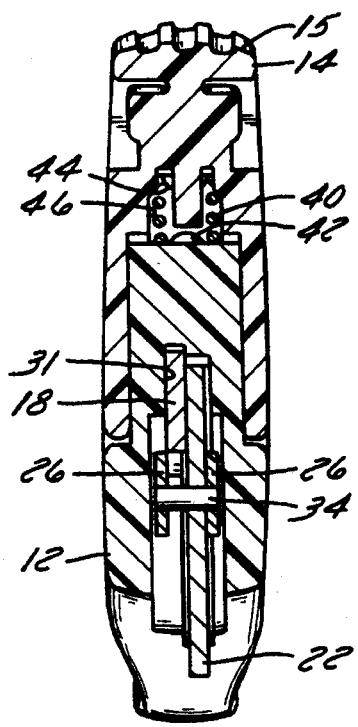
FIG. 7 is a view taken on line C—C of FIG. 1.
Figure 8:
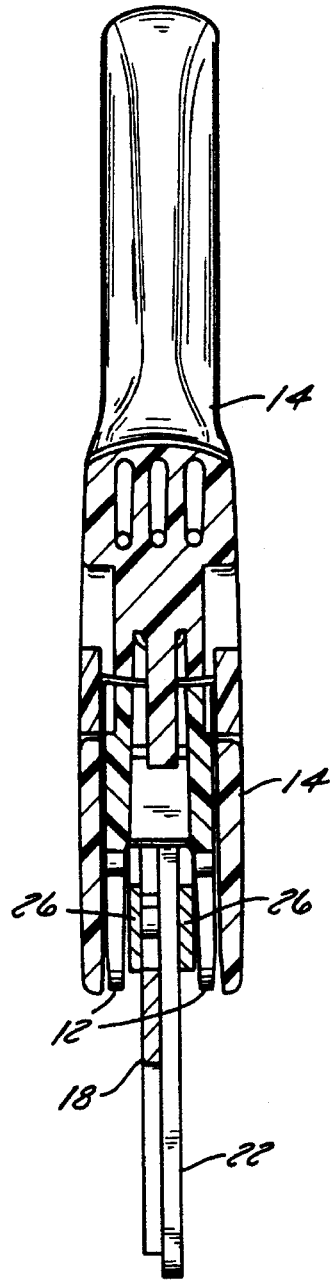
FIG. 8 is a view taken on line D—D of FIG. 1.
Figure 10:
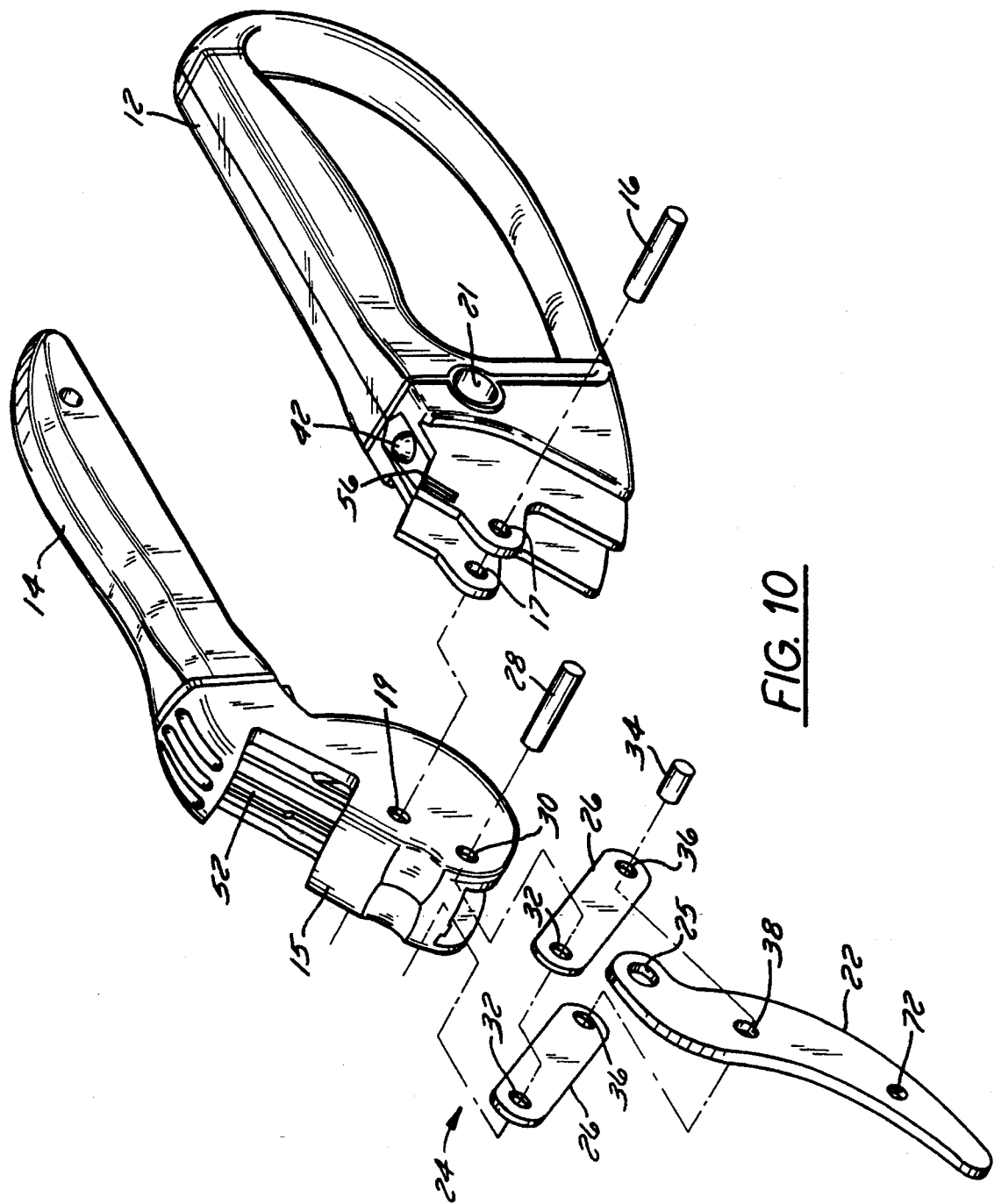
FIG. 10 is an exploded perspective view of the linkage assembly.

The hand pruner 10 according to the present invention as shown in FIGS. 1 through 11 relates to a bypass or scissors type hand pruner and the pruner in FIGS. 12 through 21 relates to an anvil type pruner. Although the two types of pruners operate on a different principle both include a lower handle 12 and an upper or operating handle 14 pivotally connected to the lower handle 12 by a pin 16 which passes through hole 17 in the handle 12 and holes 19 in the handle 14. The end section 15 of the handle 14 is bent at approximately a 45° angle to the handle 14 to provide better viewing as well as reducing fatigue in the arm of the operator. A blade 18 is removably secured to the lower handle 12 by means of a bolt 20 which passes through holes 21 in handle 12 and hole 23 in blade 18. The bolt 20 is secured therein by means of a cap 11. A hook 22 is pivotally mounted on the bolt 20 which passes through hole 25 in hook 22 as shown in FIG. 10.

Figure 11:
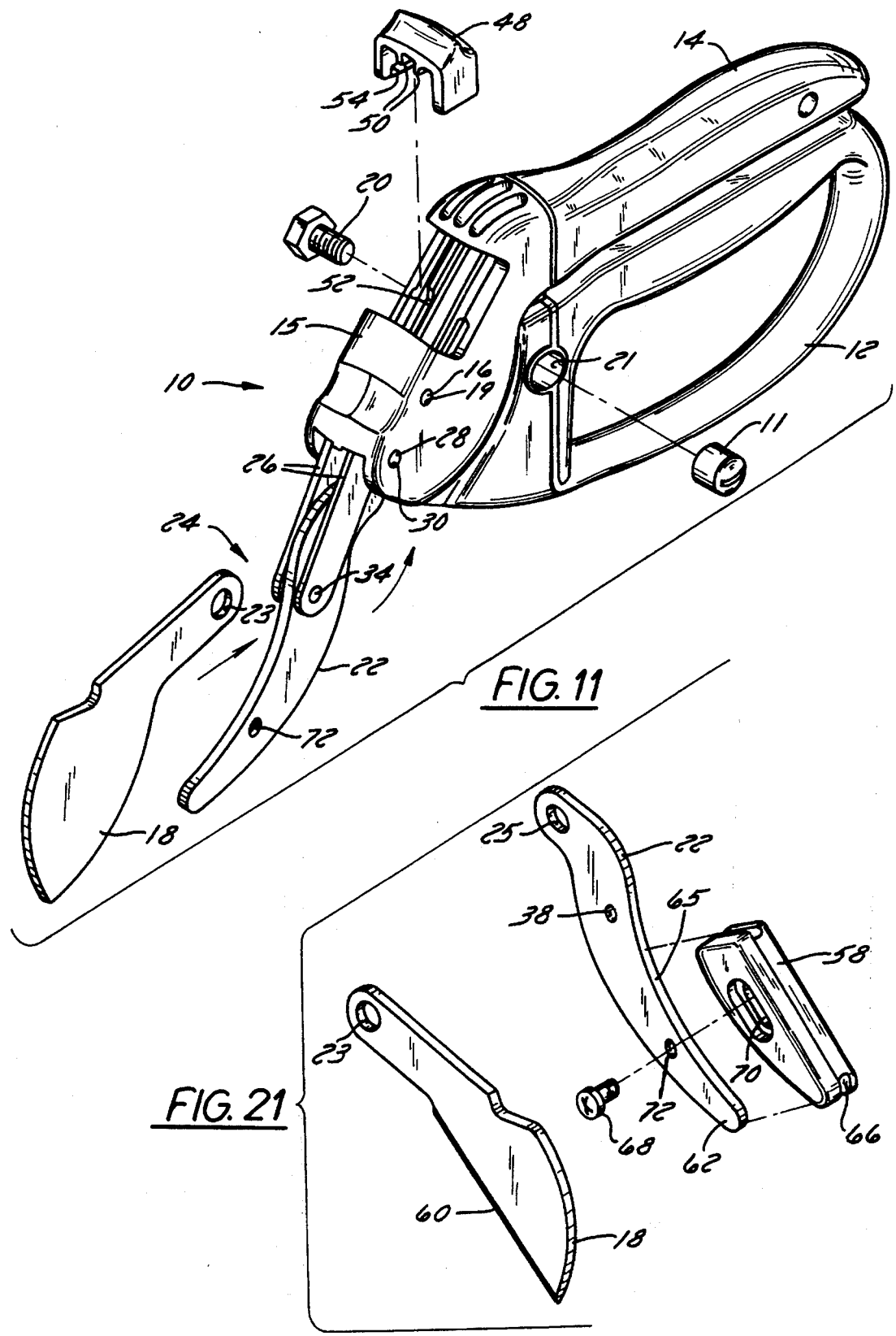
FIG. 11 is view similar to FIG. 10 showing the linkage partly assembled.
Figure 12:
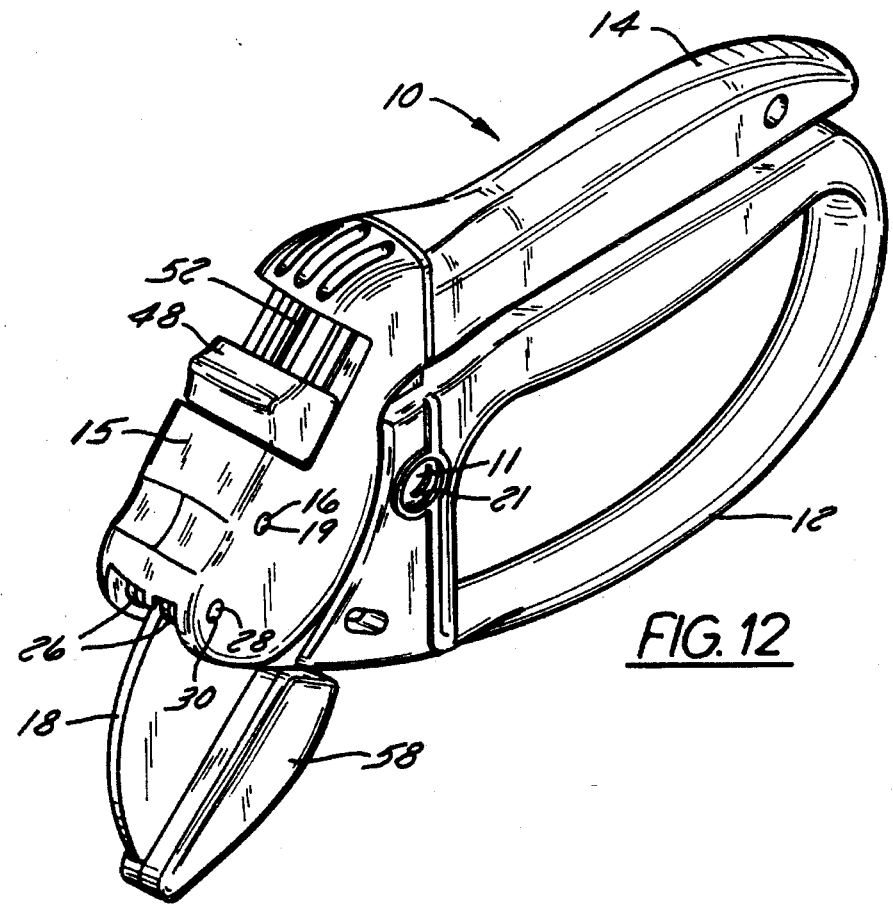
FIG. 12 is a perspective view of the left side of the pruner having an anvil mounted on the hook blade.
Figure 13:
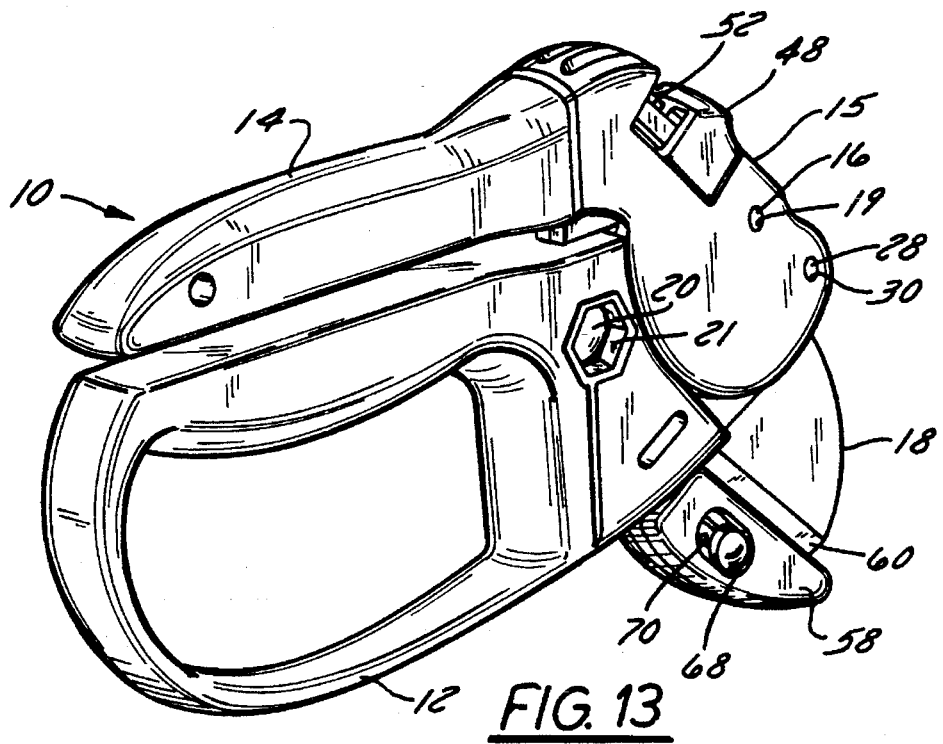
FIG. 13 is a perspective view of the right side of the pruner.
Figure 14:
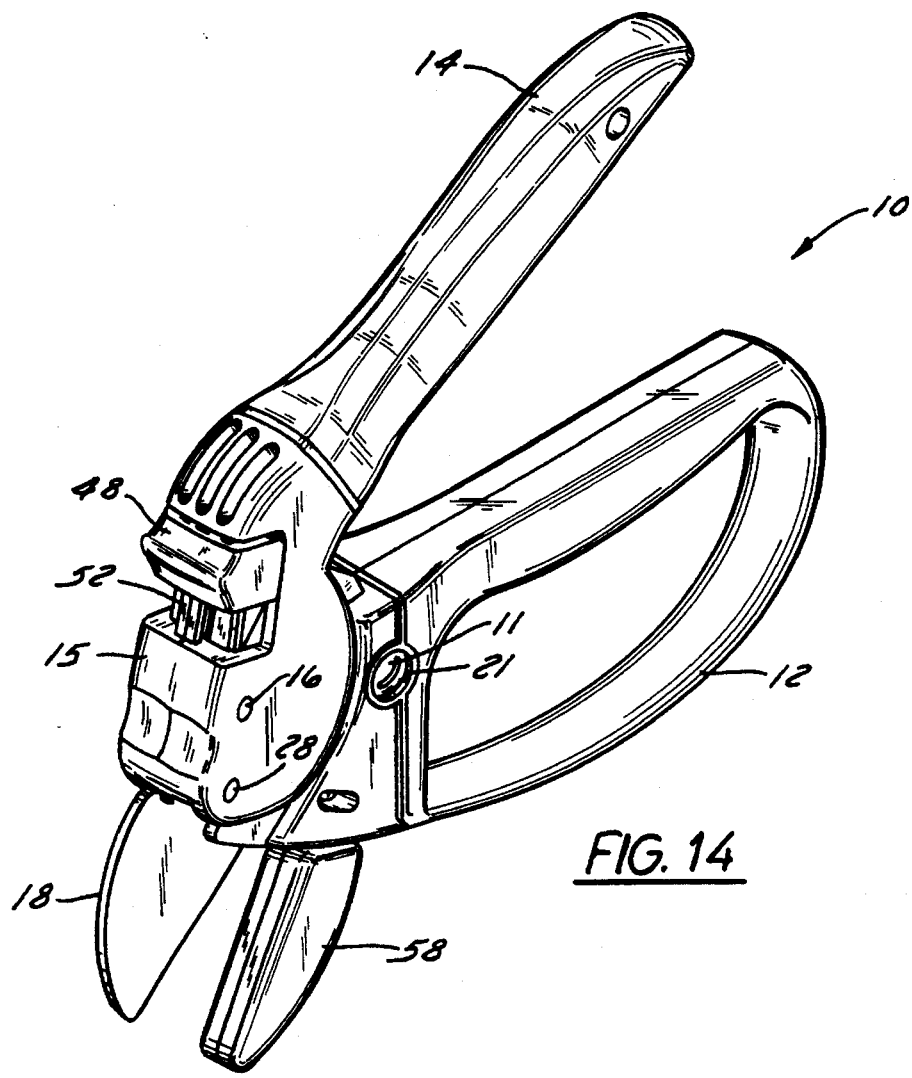
FIG. 14 is a view similar to FIG. 12 showing the pruner in the open position.
Figure 15:
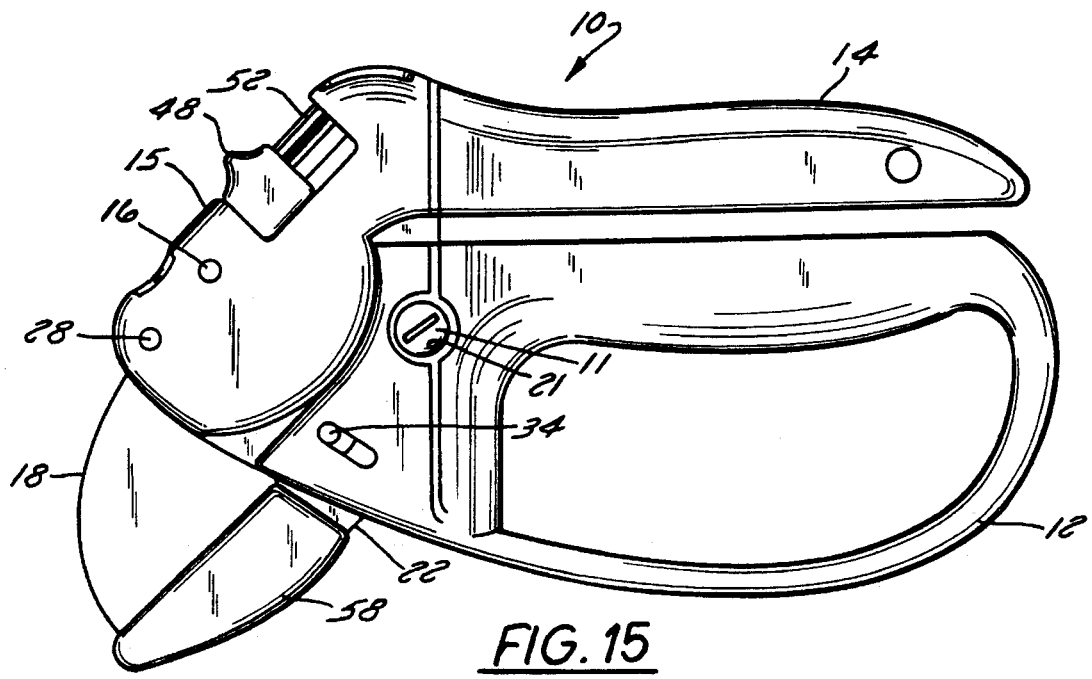
FIG. 15 is a left side view of the pruner.
Figure 17:
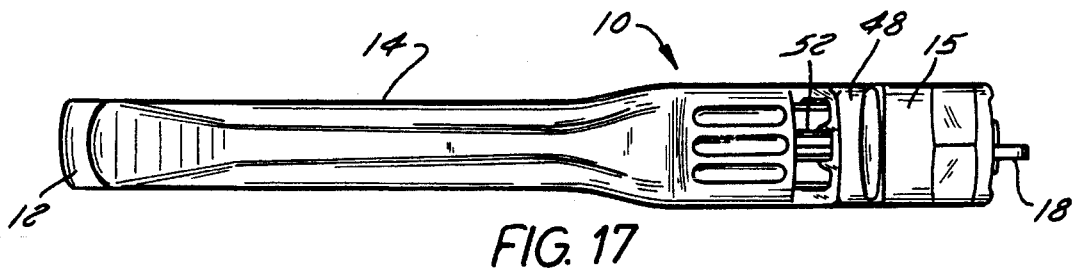
FIG. 17 is a top view of the pruner.
Figure 16:
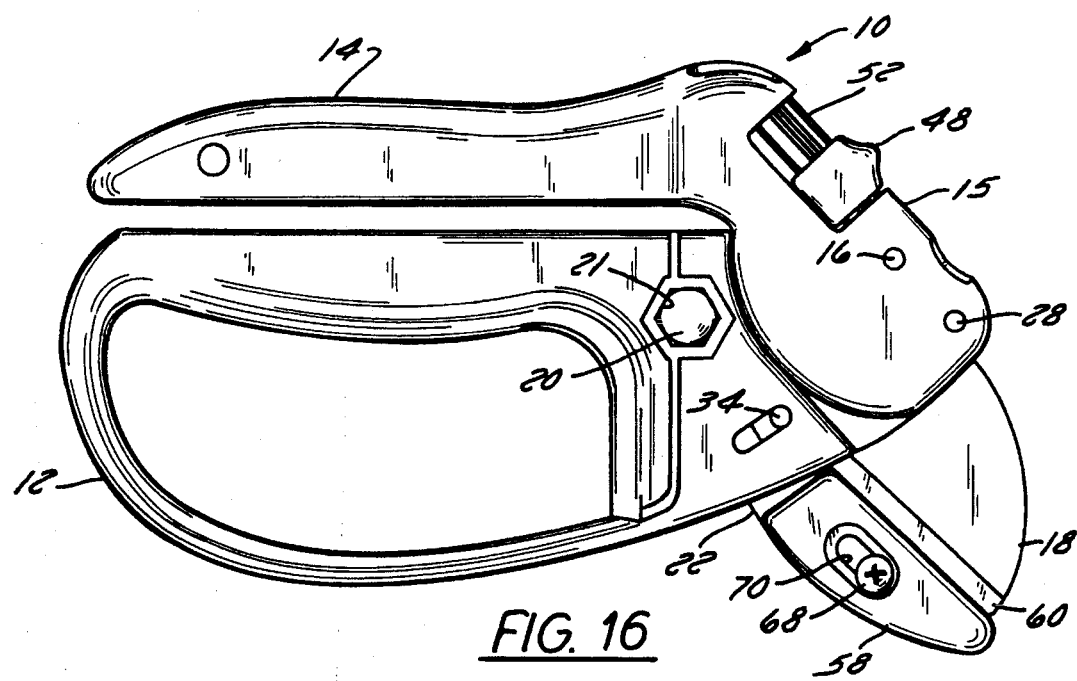
FIG. 16 is a right side elevation view of the pruner.
Figure 18:
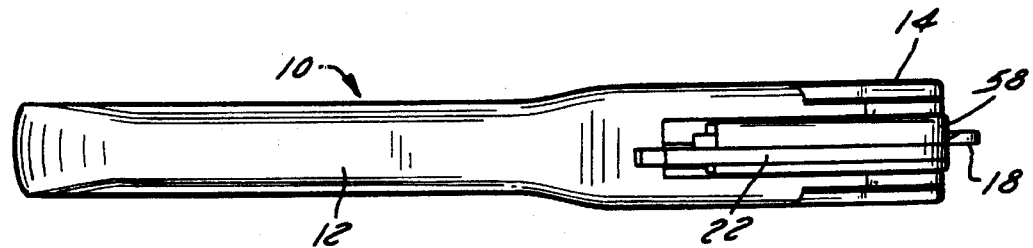
FIG. 18 is a bottom view of the pruner.
Figure 19:
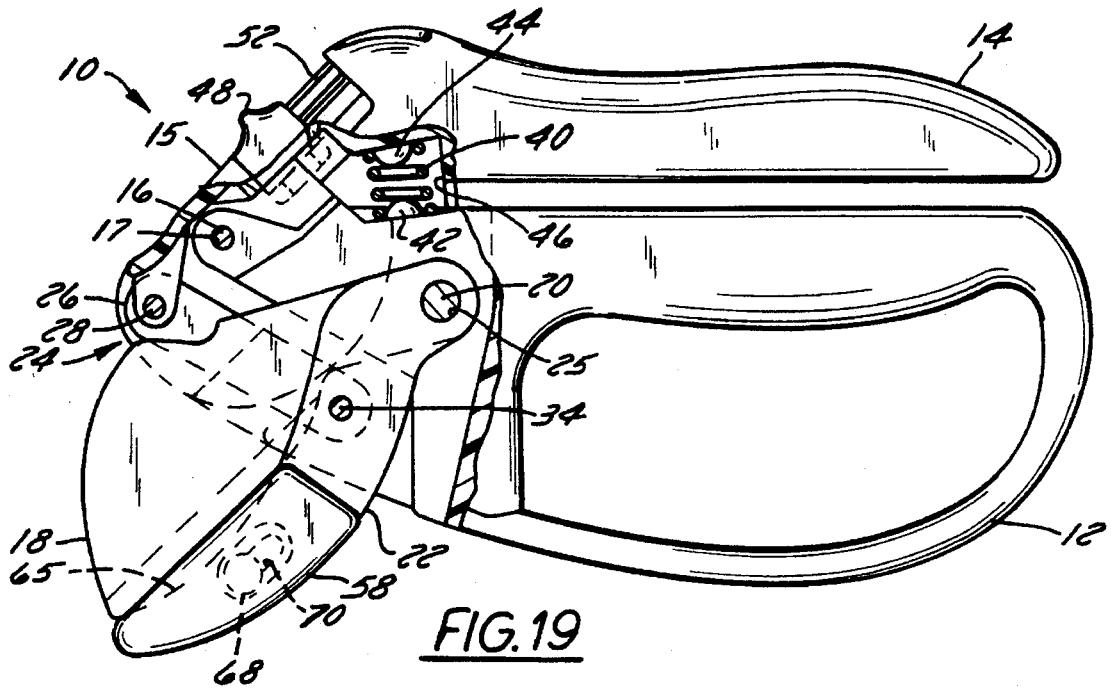
FIG. 19 is a left side view of the pruner partly broken away to show the link assembly.
Figure 20:
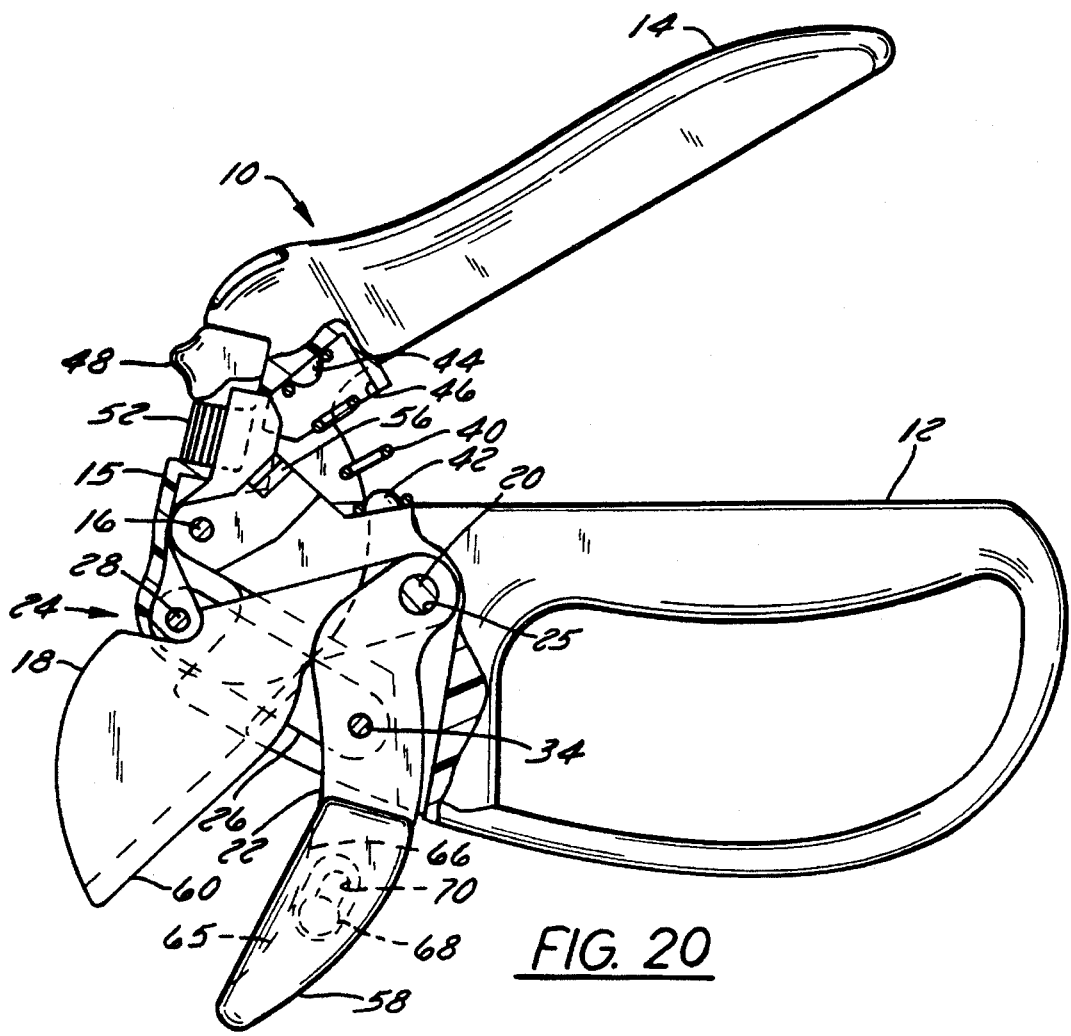
FIG. 20 is a view similar to FIG. 19 showing the link assembly in the open position.

The hook 22 is moved into engagement with the blade 18 by means of a trilever linkage 24 as shown in FIGS. 10 and 11 which provides a maximum cutting force between the hook 22 and the blade 18 when the hook 22 is moved halfway through its path of travel. In this regard the trilever link assembly 24 includes a pair of links 26, each having one end pivotally connected to the end 15 of the handle 14 by a pin 28 which passes through an opening 30 in the upper handle 14 and holes 32 in one end of links 26. The other end of links 26 are pivotally connected to the hook 22 by a pin 34 which passes through holes 36 in links 26 and hole 38 in hook 22.

The handle 14 is biased to an open position as shown in FIG. 9 by a compression spring 40 which is seated on a rib 42 on the lower handle 12 and a rib 44 in a recess 46 in the upper handle 14. The operating handle 14 is locked into engagement with the lower handle 12 by means of a latch 48. In this regard the latch 48 as shown in FIG. 11 includes a pair of ribs 50 which matingly engage a rib 52 on the operating handle 14. The latch 48 also includes a pair of ribs 54 on the bottom which engage a slot 56 in the handle 12 when the latch 48 is pushed downward into engagement with slots 56 in the lower handle 12 as shown in FIG. 11.

The pruner 10, as shown in FIGS. 1 and 12 through 21, includes an anvil 58 mounted on hook 22. In this regard, as shown in FIG. 21, the hook 22 is converted to an anvil type cutter by mounting the anvil 58 on the edge 65 of the hook 22. The anvil 58 includes a slot 66 which matingly engages the curvature of the edge 65 of hook 22. The anvil 58 is secured to the hook 22 by means of a bolt 68 which passes through an opening 70 in the anvil and hole 72 in hook 22 for engagement with a threaded hole in the anvil (not shown). It should be noted that the anvil 58 is laterally offset into the path of travel of the blade 18.

In operation the latch 48 is pushed upward to release the latch from the notch 56 in handle 14. The spring 40 pivots the operating handle 14 about pin 16 to an angle of approximately 30° with respect to the lower handle 12. The pivotal movement of the handle 14 pivots the anvil 58 on hook 22 away from the blade 18. When the handle 14 is closed the handle will pivot about pin 16 and the link 26 will pull the hook 22 about bolt 20 thereby moving the anvil 58 into cutting engagement with the blade 18. The force of the anvil 58 closing on the blade 18 will initially increase due to the spaced relation of the links 26 to the pivot points of pin 16 and bolt 20 as more specifically described hereinafter.

The blade 18 is releasably mounted in the handle 12 to allow for interchange or sharpening of the edge 60 of the blade 18. In this regard, it should be noted that the blade 18 is aligned in a slot 31, FIG. 7, in handle 12 and retained therein by the bolt 20 which passes through the opening 23 in the blade 18. The blade is removed by removing the cap 11 from the bolt 20 and sliding the bolt out of the hole 23 in blade 18.

The maximum cutting force $F_R$ of the blade 18 with the hook 22 will occur when the trilever link assembly 24 passes through the midpoint, i.e. 15° of the movement of the handle 14 from full open to full close. The trilever link assembly refers to the relation of the links $P_1P_4$, $P_4P_3$ and $P_3P_2$ as shown in FIG. 9. When the links $P_1P_4$ and $P_4P_3$ are at right angles and links $P_4P_3$ and $P_3P_2$ are at right angles the maximum force $F_R$ is applied to the object to be cut. This relationship occurs when the handles are moved from an angle of 30° to an angle of 15°. The trilever formula for this relationship is $$F_r = \left[ \frac{(F_1 \times \text{Distance } P_1 \text{ to } F_1)}{\text{Distance } P_1 \text{ to } P_4} \cos\alpha \right] \times$$

$$[(\text{Distance } P_2 \text{ to } P_3)\cos\beta] \times \left[ \frac{1}{\text{Distance } F_r \text{ to } P_2} \right]$$

wherein:

$F_R$ is the force transmitted to the workpiece $F_1$ is the force applied to the handle 14

$P_1$ is the pin 16

$P_2$ is the bolt 20

$P_3$ is the pin 34

$P_4$ is the pin 28

$\alpha$=angle formed by link $P_4P_3$ and a line perpendicular to link $P_1P_4$ at $P_4$ $\beta$=angle formed by link $P_3P_4$ and a line perpendicular to link $P_2P_3$ at $P_3$ The force $F_R$ at the midpoint of the hook 22 will increase as the links are pivoted to the midpoint position and decrease as the hook closes on the bypass blade 18 or into engagement with the anvil 58.

Thus, it should be apparent that there has been provided in accordance with the present invention a compound action hand pruner that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A hand pruner comprising a first handle having a first pivot section and a handle section, a second handle having a second pivot section and a second handle section, a first pin pivotally connecting said first pivot section to said second pivot section, a hook having one end pivotally connected to said second handle section, a bolt pivotally connecting said one end of said hook to said second handle section, a stationary cutting blade mounted in said second handle section and having one end secured to said bolt and the other end located in the path of travel of said hook and a pair of links connecting said hook to said first pivot section whereby the pivotal movement of said first handle with respect to said second handle will pull the hook into engagement with said stationary blade.

2. The pruner according to claim 1 wherein said links are connected to said first pivot section in a spaced relation to said first pin and to the hook in a spaced relation to said bolt.

3. The pruner according to claim 2 including an anvil mounted on said hook in the path of travel of said blade.

4. The pruner according to claim 3 including an anvil mounted on said second blade and being laterally offset from said second blade into the path of motion of said first blade.

5. The pruner according to claim 2 wherein the force $F_R$ applied to the workpiece is a function of the formula $$F_r = \left[ \frac{(F_1 \times \text{Distance } P_1 \text{ to } F_1)}{\text{Distance } P_1 \text{ to } P_4} \cos\alpha \right] \times$$

$$[(\text{Distance } P_2 \text{ to } P_3)\cos\beta] \times \left[\frac{1}{\text{Distance } F_r \text{ to } P_2}\right]$$

wherein:

$F_R$ is the force transmitted to the workpiece $F_1$ is the force applied to the handle 14

$P_1$ is the pin 16

$P_2$ is the bolt 20

$P_3$ is the pin 34

$P_4$ is the pin 28

$\alpha$=angle formed by link $P_4P_3$ and a line perpendicular to link $P_1P_4$ at $P_4$ $\beta$=angle formed by link $P_3P_4$ and a line perpendicular to link $P_2P_3$ at $P_3$.

* * * * *